(12) United States Patent
Sankrithi et al.

(10) Patent No.: US 7,621,482 B2
(45) Date of Patent: Nov. 24, 2009

(54) WEIGHT OPTIMIZED PRESSURIZABLE AIRCRAFT FUSELAGE STRUCTURES HAVING NEAR ELLIPTICAL CROSS SECTIONS

(75) Inventors: Mithra M. K. V. Sankrithi, Lake Forest Park, WA (US); Kevin Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 11/273,966

(22) Filed: Nov. 15, 2005

(65) Prior Publication Data

US 2007/0108347 A1    May 17, 2007

(51) Int. Cl.
*B64C 1/06* (2006.01)
(52) U.S. Cl. .................................. 244/119; 244/117 R
(58) Field of Classification Search ............. 244/117 R, 244/36, 119, 120; D12/319, 337, 333, 343
See application file for complete search history.

(56) References Cited

U.S. PATENT DOCUMENTS

| | | | | |
|---|---|---|---|---|
| 2,147,552 A | * | 2/1939 | Saives | .......................... 52/222 |
| 2,314,949 A | * | 3/1943 | Palmer | ......................... 244/119 |
| 2,412,778 A | * | 12/1946 | Kosek | .......................... 244/120 |
| 3,854,679 A | * | 12/1974 | Smethers, Jr. | ................ 244/106 |
| 4,715,560 A | * | 12/1987 | Loyek | ..................... 244/117 R |
| 5,042,751 A | | 8/1991 | Kolom | |
| 6,834,833 B2 | * | 12/2004 | Sankrithi | ..................... 244/119 |

* cited by examiner

*Primary Examiner*—Tien Dinh
(74) *Attorney, Agent, or Firm*—Haynes & Boone, LLP.

(57) ABSTRACT

An aircraft fuselage includes a tubular shell having a centerline axis, opposite ends, and a cross-section having a radius $R(\phi)$, where $\phi$ is the angular coordinate of a cylindrical coordinate system, a curvature $Curv(\phi)$, where $Curv(\phi)$ is the inverse of a local radius of curvature of a surface of the shell, and a circumferential shape that varies radially by no more than ±7% from that of an elliptical cross-section at substantially every station along the centerline axis between the nose and tail ends thereof. The weight of the shell is minimized by "tailoring," i.e., optimizing, at least one structural attribute, expressed as a function of $\phi$, associated with every element of the shell, such that the weight of the shell required to react a design load incident thereon is less than that required to react the same design load, but wherein the same structural attribute has not been so tailored.

11 Claims, 9 Drawing Sheets

WEIGHT OPTIMIZED PRESSURIZABLE AIRCRAFT FUSELAGE STRUCTURES HAVING NEAR ELLIPTICAL CROSS SECTIONS

TECHNICAL FIELD

This invention relates to aircraft design in general, and in particular, to the design of a lightweight structure for a pressurizable aircraft fuselage having an elliptical or near-elliptical cross-section.

BACKGROUND

Certain classes of internally pressurizable aircraft fuselages, such as passenger planes, can beneficially employ near-elliptical cross-sections. For example, U.S. Pat. No. 6,834,833 to M. K. V. Sankrithi discloses the use of an aircraft having a fuselage 10 with a quasi-elliptical, or near-elliptical cross-section that is wider than it is tall. Representative front-end and a top plan cross-sectional views of this class of fuselage shape are illustrated in FIGS. 1A and 1B, respectively, wherein the fuselage comprises a rigid, light weight shell 12 having respective opposite, closed nose and tail ends 14 and 16. This cross-section efficiently encloses a main deck cabin 18, typically provisioned as a spacious and comfortable twin-aisle, seven-abreast cabin, together with a cargo container 14 (typically a LD-3-46W or similar, standardized type of container) in a lower deck hold 20. This twin-aisle fuselage cross-sectional shape has also been shown to provide a perimeter-per-seat ratio comparable to that of a corresponding single-aisle, six-abreast, conventional aircraft fuselage having a circular or blended circular arc cross-section, and consequently, can also provide a cross-section-parasite-drag-per-seat ratio and an empty-weight-per-seat ratio that, in a zeroth-order analysis, are comparable to those of the corresponding single-aisle fuselage cross-section, while offering better passenger comfort and owner revenue options.

However, achieving an optimized, lightweight structure for such near-elliptical cross-section fuselages presents a substantial engineering design challenge because of the structural and weight penalties involved in moving from a fuselage design having a conventional circular cross-section to a fuselage design having a non-circular cross-section, especially those penalties that are associated with pressurization effects inherent in the design of high-altitude jet airliners.

Accordingly, there is a need in the aviation industry for design methods and techniques for achieving lightweight structures for pressurizable aircraft fuselages having an elliptical or a near-elliptical cross-section.

BRIEF SUMMARY

In accordance with the various exemplary embodiments thereof described herein, the present invention provides an internally pressurizable fuselage structure for an aircraft having a near-elliptical shape and a weight that is minimized by "tailoring," i.e., optimizing, the structural attributes of substantially every element of the fuselage, expressed as a function of the angular coordinate $\phi$ of a cylindrical coordinate system of the fuselage, to react, i.e., to sustain without failure, all design loads incident thereon.

In a preferred exemplary embodiment thereof, the fuselage structure comprises an elongated tubular shell having a central axis x, opposite closed nose and tail ends, and a non-circular cross-section having a radius $R(\phi)$ at substantially every point along the x axis between the two ends, where $\phi$ is the cylindrical angular coordinate, i.e., a roll elevation angle of the shell, that varies from 0 degrees to +360 degrees about the x axis. The radius $R(\phi)$ of each cross-section of the shell is constrained to vary radially by no more than ±7% from a radius $r(\phi)$ of a true elliptical cross-section having a major axis of dimension $2 \cdot r_{max}$ and a minor axis of dimension $2 \cdot r_{min}$, and where $r(\phi)$ is given by the relation:

$$r(\varphi) = \frac{r_{min}}{\sqrt{[((r_{min}/r_{max})^2 \cdot (\cos\varphi)^2) + (\sin\varphi)^2]}}.$$

In the preferred embodiment, the maximum width of the shell exceeds the maximum height thereof, and the maximum width and height of the shell are respectively substantially aligned with the major and minor axes of the true elliptical cross-section. A curvature, $Curv(\phi)$, defined as the inverse of the local radius of curvature of a surface of the shell, is associated with $R(\phi)$, and a corresponding curvature $\kappa(\phi)$ associated with $r(\phi)$ of the true elliptical cross-section is given by:

$$\kappa(\varphi) = \frac{\left[ r^2 + 2 \cdot \left(\frac{\partial r}{\partial \varphi}\right)^2 - r \cdot \frac{\partial^2 r}{\partial \varphi^2} \right]}{\left[ r^2 + \left(\frac{\partial r}{\partial \varphi}\right)^2 \right]^{1.5}}.$$

The exemplary shell has at least one structural attribute associated with every cross-sectional element thereof that has been tailored as a function of the elevation angle $\phi$ such that the weight of the shell required to react the design loads incident on that element is less than that required to react the same design load, but wherein the at least one structural attribute has not been so tailored. In a preferred embodiment, the function of $\phi$ consists of either $R(\phi)$ or $Curv(\phi)$. Thus, an exemplary embodiment of a method for weight-optimizing, i.e., minimizing the weight of, the fuselage comprises defining at least one structural attribute of every circumferential element of the shell as a function of either $R(\phi)$ or $Curv(\phi)$, i.e., as a "functional," and then tailoring the at least one structural attribute of the element such that the weight of the shell required to react all design loads incident on each circumferential element thereof is less than that required to react the same design loads acting thereon, but wherein the at least one structural attribute has not been so tailored.

Advantageously, the shell of the fuselage can function as a pressure vessel in which the design loads of major interest include internal pressurization loads. The shell can comprise a circumferential outer skin and circumferentially spaced longitudinal stringers, disposed adjacent to an inner surface of the skin, and the at least one tailored structural attribute can comprise at least one of a cross-sectional shape and size, number, and material of the stringers. Each of at least one of the circumferential skin and the stringers can comprise a "composite" of a plurality of plies, each having a selected angular orientation relative to the others, the at least one tailored structural attribute can comprise at least one of the number, relative angular orientation, and material of the plies.

Alternatively, the shell can comprise a "sandwich" structure, i.e., circumferential outer and inner skins attached to a rigid core, which can comprise either of a continuous rigid foam or of interconnected cells, and the at least one tailored structural attribute can comprise at least one of a thickness of the core, a core density or core cell density and a core material. The skins can be made from either thermosetting or thermoplastic material, and by hand lay up, machine lay up or resin infused.

In another embodiment, the shell can comprise an "isogrid" structure having at least one external face sheet attached to a grid comprising internal stiffening members, and the at least one tailored structural attribute can comprise at least one of grid spacing, grid geometry, grid material and face sheet material.

In still yet another embodiment, the shell can comprise a filament-wound structure in which the at least one tailored structural attribute may include the filament cross-sectional shape and size, winding pitch, and/or the number of fibers in the filament.

A better understanding of the above and many other features and advantages of the present invention may be obtained from a consideration of the detailed description of the exemplary embodiments thereof below, particularly if such consideration is made in conjunction with the appended drawings, wherein like reference numerals are used to identify like elements illustrated in one or more of the figures therein.

DETAILED DESCRIPTION

Figure 1A:
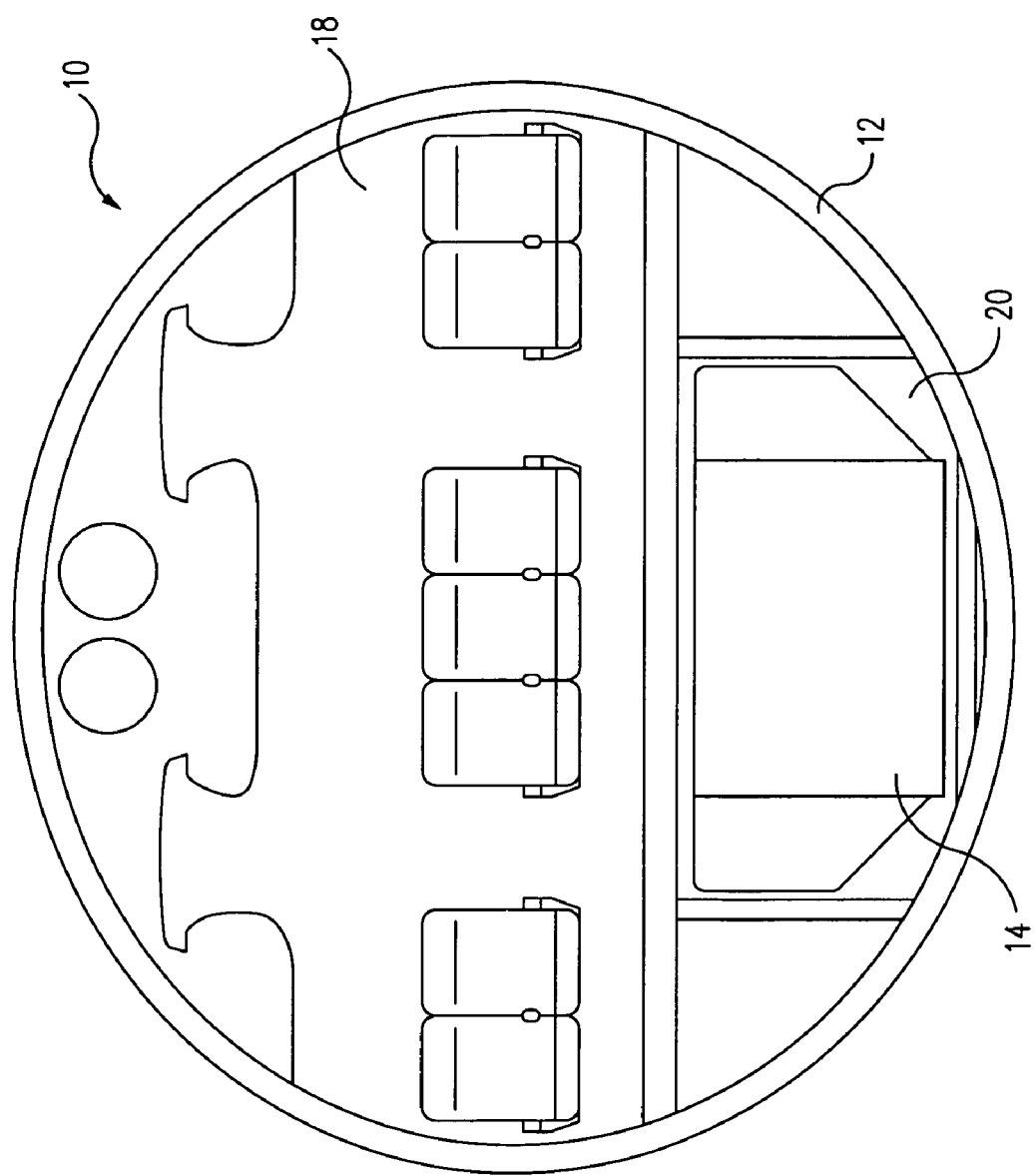
FIGS. 1A and 1B are cross-sectional front end and top plan views, respectively, of an internally pressurizable aircraft fuselage in accordance with the prior art.
Figure 1B:
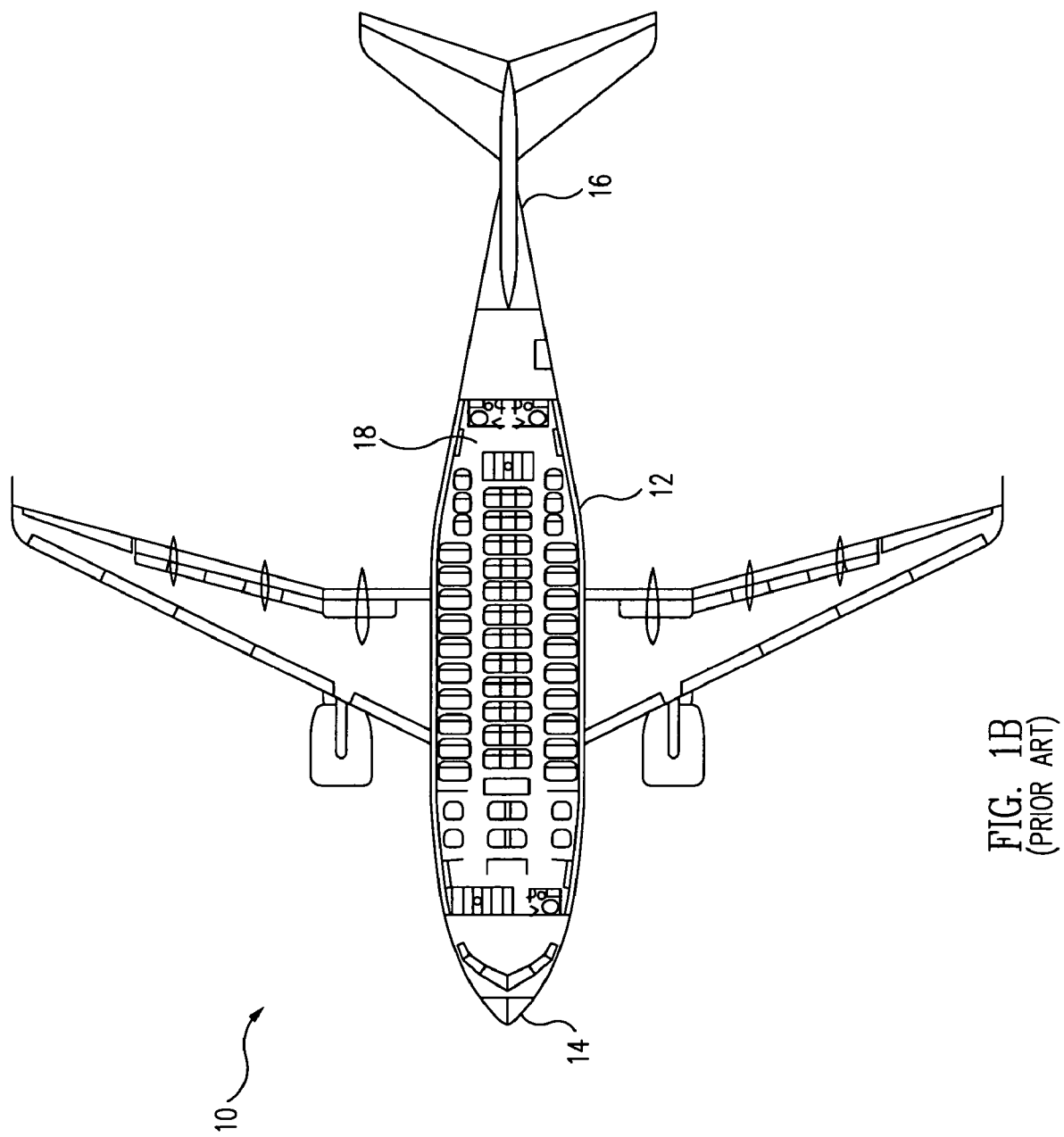
Figure 2A:
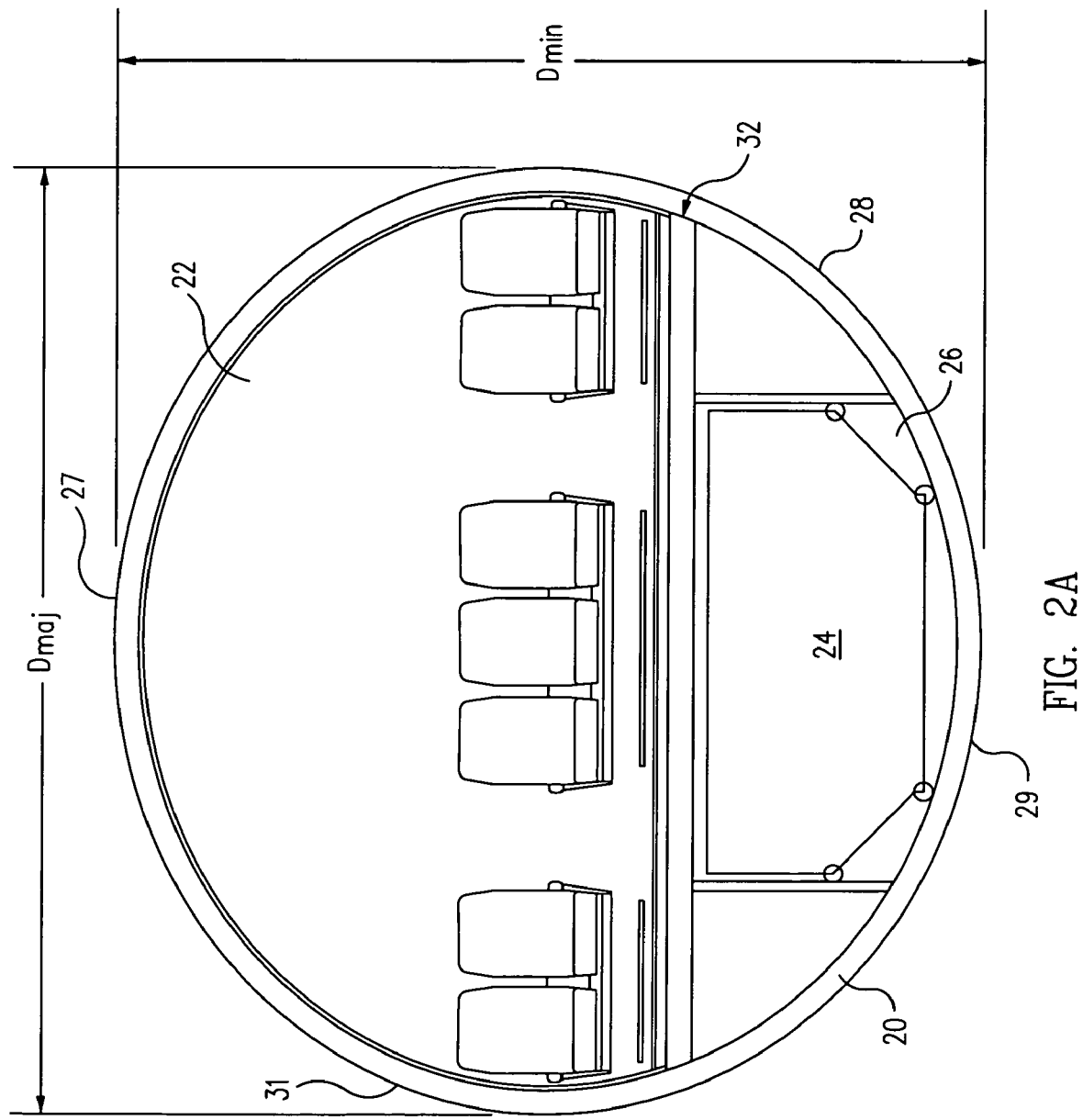
FIGS. 2A and 2B are cross-sectional front end and top plan views, respectively, of an exemplary embodiment of an internally pressurizable aircraft fuselage in accordance with the present invention.

FIGS. 1A and 1B respectively illustrate cross-sectional front end and plan views of a prior art pressurizable aircraft fuselage 10 having a passenger cabin 18 and a cargo compartment 20. This invention provides a lightweight fuselage shell structure for such an aircraft in which the shell has a near-elliptical cross-section by applying "tailoring," i.e., optimally selected adjustments, of the structure to more closely match critical design loads as a function of the roll elevation angle $\phi$ measured around the centerline axis of the cross-section. An exemplary embodiment of a fuselage shell 20 having a near-elliptical cross-section in accordance with the present invention is illustrated in the front-end cross-sectional view of FIG. 2A. In FIG. 2A, the periphery or outer periphery of the shell is designated 28, and a window belt 31 is disposed adjacent to a passenger cabin 22 having a main cabin floor 32. A cargo compartment 26 is shown with a Unit Load Device or cargo container 24. A crown region 27 and a keel region 29 of the shell define the upper and lower extremities of the shell.

For the purposes of this invention, the term "near-elliptical cross-section" should be understood as a cross-section that is approximately elliptical in shape, with a width-to-height (or height-to-width) ratio that is between 1.01 and 1.30, and with a cross-sectional periphery, or circumference, that is either a "pure" ellipse, i.e., strictly elliptical in shape, or that is between ±7% from such a strictly elliptical shape, as measured in a direction extending radially outward from the centerline axis of the fuselage shell cross-section, at substantially every point, or longitudinal station, along the central axis thereof.

Figure 2B:
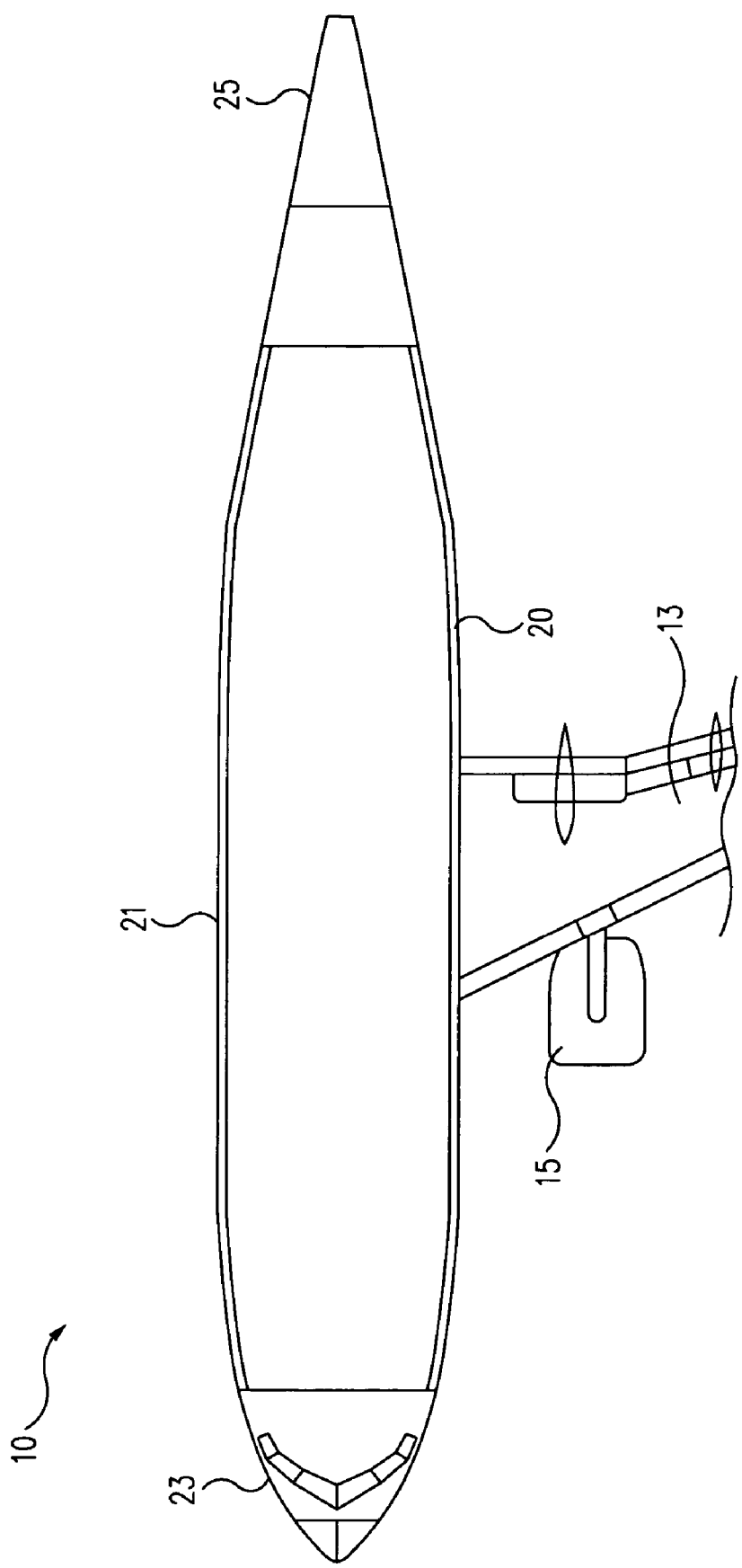

FIG. 2B illustrates a plan view of the embodiment of FIG. 2A, showing an elongated, internally pressurizable tubular shell 21 and opposite closed nose and tail ends 23 and 25, as well as means for lifting 13 (e.g., wings) the shell off the ground and for propelling 15 (e.g., engines) it relative to the ground.

Figure 3:
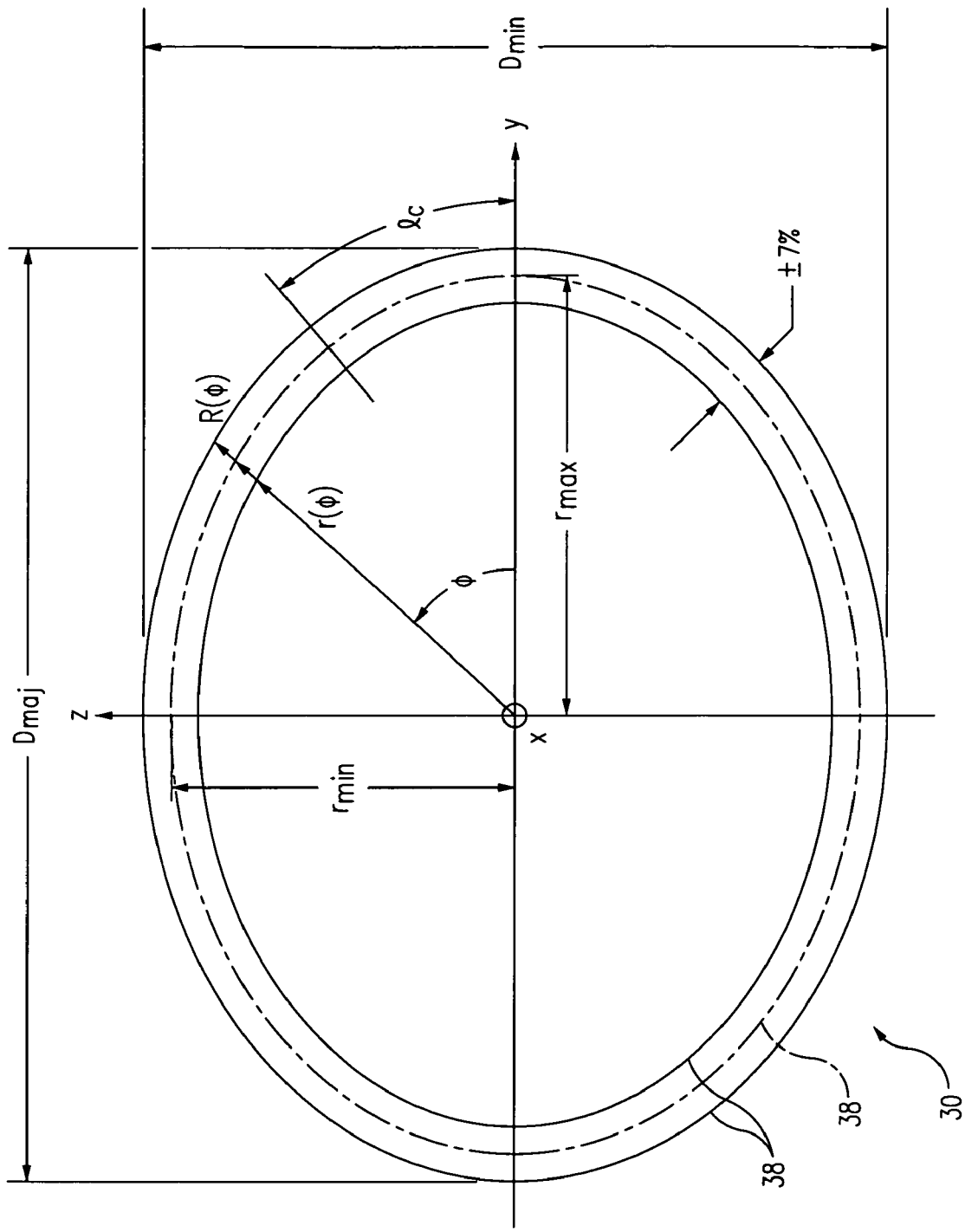
FIG. 3 is a representative cross-sectional diagram of the fuselage of FIG. 2, as expressed in a cylindrical coordinate system.

As illustrated schematically in FIG. 3, for purposes of description, a cylindrical coordinate system is assumed, with x positive forward substantially along the longitudinal, or centerline axis of the fuselage shell 30; where the radius r is positive radially outward from the x axis, and the angular coordinate $\phi$ is positive rotating upward from $\phi=0$ from a substantially horizontal vector pointing to the right of the aircraft, looking forward, at right angles to the x axis. Thus, it may be seen that the cylindrical angular coordinate $\phi$ corresponds to a "roll elevation angle" of the shell that varies from 0 degrees to +360 degrees about the x axis. The corresponding Cartesian coordinate system has an x-axis that is positive forward along the centerline axis of the fuselage shell cross-section, a y axis that is positive to the left side of the centerline axis of the aircraft, and a z axis that is positive upwards from the centerline axis, as illustrated in FIG. 3.

If the nominal shape of the periphery or circumferential perimeter 38 of the cross-section of the aircraft's fuselage shell 30 is that of a "true" ellipse, as shown by the phantom outline of FIG. 3, i.e., one having a substantially horizontal major axis of diameter $D_{maj}$ (width) equal to $2 \cdot r_{max}$ and a substantially vertical minor axis with a diameter $D_{min}$ (height) equal to $2 \cdot r_{min}$, and with an eccentricity e given by $$e = \sqrt{(1 - (r_{min}/r_{max})^2)},$$

then the radius r, expressed as a function of $\phi$, is given by $$r(\varphi) = \frac{D_{min}}{2 \cdot \sqrt{[((r_{max}/r_{min})^2 \cdot (\cos\varphi)^2) + (\sin\varphi)^2]}},$$

or, by defining $A = (r_{min}/r_{maj}) = (D_{min}/D_{maj})$, by $$r(\varphi) = \frac{D_{min}}{2 \cdot \sqrt{((A^2 \cdot \cos^2\varphi) + \sin^2\varphi)}}.$$

A "curvature," $\kappa(\varphi)$, defined as the inverse of the local radius of curvature for the surface, is given for the true elliptical shape 38 by the following equation:

$$\kappa(\varphi) = \frac{\left[r^2 + 2\cdot\left(\frac{\partial r}{\partial \varphi}\right)^2 - r\cdot\frac{\partial^2 r}{\partial \varphi^2}\right]}{\left[r^2 + \left(\frac{\partial r}{\partial \varphi}\right)^2\right]^{1.5}}.$$

However, if the nominal cross-sectional outer surface or perimeter 38 of the shell 30 is not a true ellipse, but rather, a near-ellipse, as described above, the equations for the local radius and curvature are not exactly as stated above, but instead, result in slightly different equations, or more practically, can comprise digitally specified curves that are amenable to digital computer modeling techniques. Thus, for purposes of this invention, a fuselage shell 30 is considered to have a near-elliptical cross-sectional shape when its radius function $R(\varphi)$ varies radially by no more than ±7% from a radius $r(\varphi)$ of a true elliptical cross-section $r(\varphi)$, as illustrated in FIG. 3. Likewise, the local curvature of the near-ellipse, defined herein as "Curv($\varphi$)," may differ correspondingly from the curvature $\kappa(\varphi)$ of the pure elliptical shape, and still be deemed to have a near-elliptical cross-sectional shape in accordance with the invention.

As those of skill in the art will appreciate, the distribution of critical design loads around the circumferential perimeter 38 of a fuselage shell 30 having a near-elliptical cross-section may vary at different longitudinal fuselage locations, or stations, depending not only on pressurization-induced loads, but also on combinations of such pressurization loads with other fuselage bending and torsional loads, for example, those resulting from horizontal and vertical tail-maneuver related loads, or wind gust loads, and critical design loads may further be driven by compression, tension, shear and buckling considerations in selected parts of the fuselage structure, as well as minimum material gauge or thickness considerations, barely visible impact damage (BVID) criteria for potential damage by hail or other impacts, and fatigue and/or aeroelastic design considerations and criteria.

It may be further appreciated that achieving an optimized, lightweight structure, or shell, for such near-elliptical cross-section fuselages presents a design challenge because of the structural and weight penalties involved in implementing a design having a non-circular cross-section, especially those associated with pressurization effects. However, it is has been discovered that it is possible to achieve a weight-optimized near-elliptical fuselage shell in accordance with the method described below.

Initially, it should be understood that the exemplary shell 30 has at least one structural attribute associated with every circumferential element of every cross-section thereof that can be tailored as a function of the elevation angle $\varphi$ such that the weight of the shell required to react a design load acting thereon, including any safety factor desired, is less than the weight of an identical shell necessary to react the same design load, but in which same elemental structural attribute has not been so tailored. In one preferred embodiment, the function of $\varphi$ comprises either $R(\varphi)$, Curv($\varphi$) or a combination thereof. Thus, an exemplary embodiment of a method for minimizing the weight of the fuselage shell 30 comprises defining at least one structural attribute of every circumferential element of every cross-section of the shell as a function of either $R(\varphi)$, Curv($\varphi$), or a combination thereof, i.e., as a functional, and then tailoring the at least one structural attribute of the element such that the weight of the shell required to react all design loads incident on each element thereof is less than that required to react the same design loads incident thereon, but wherein the at least one structural attribute has not been so tailored.

Figure 4:
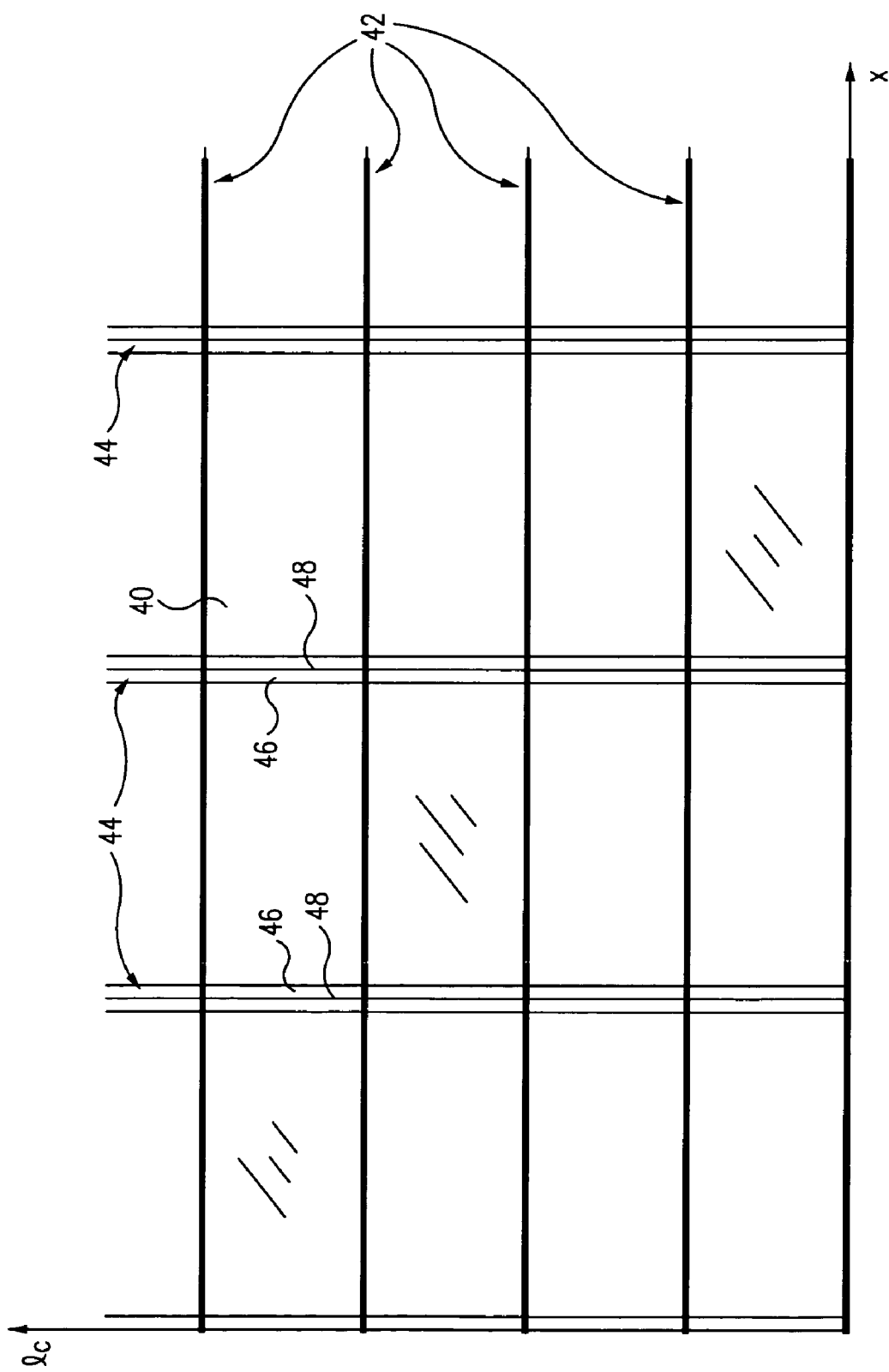
FIG. 4 is a representative diagram of an exemplary embodiment of structural components of the fuselage of FIG. 2, as expressed in a cylindrical coordinate system and mapped onto a two-dimensional plane, showing a stringer-frame type of fuselage architecture.
Figure 5A:
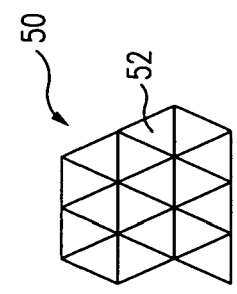
FIGS. 5A-5D are plan views of alternative embodiments of structural components of the fuselage of FIG. 2, showing exemplary embodiments of core cells of a composite-sandwich fuselage architecture.
Figure 5B:
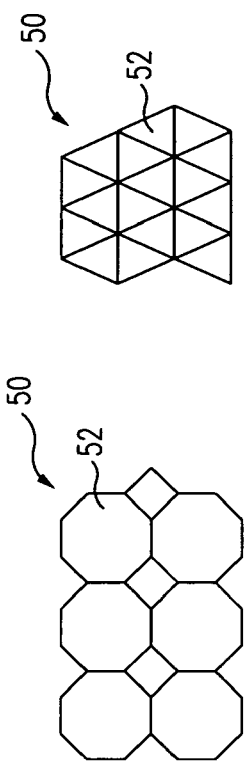
Figure 5C:
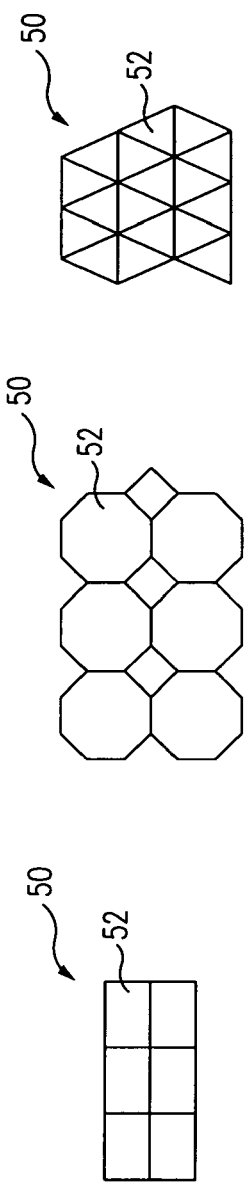
Figure 5D:
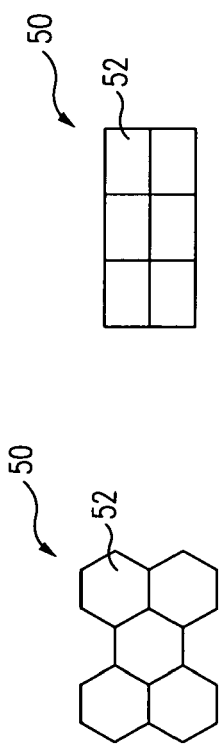
Figure 6A:
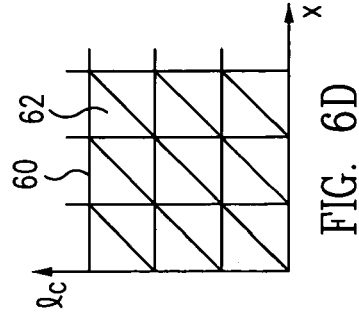
FIGS. 6A-6G are plan views of alternative embodiments of structural components of the fuselage of FIG. 2, showing exemplary embodiments of grids of a composite Isogrid fuselage architecture.
Figure 6B:
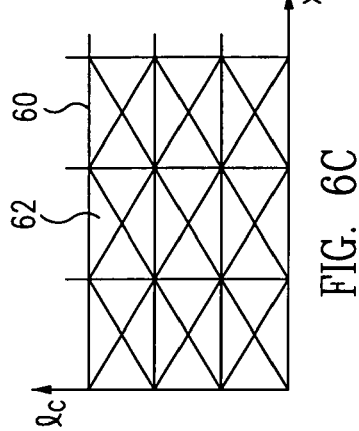
Figure 6C:
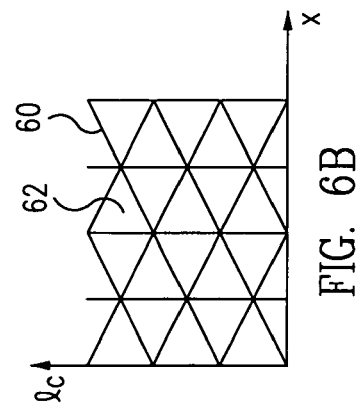
Figure 6D:
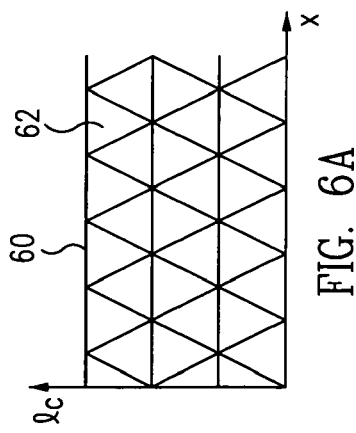
Figure 6E:
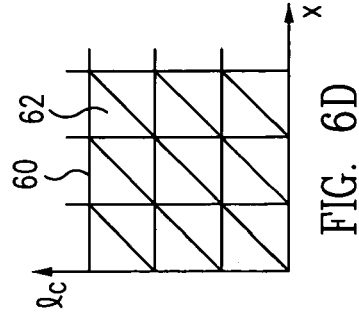
Figure 6F:
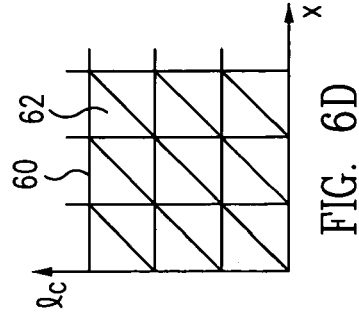
Figure 6G:
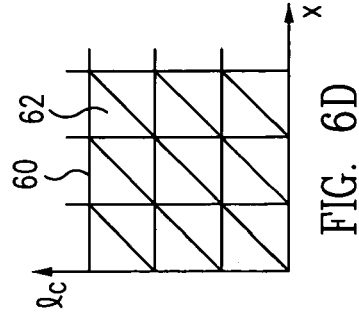

FIG. 4 schematically illustrates a representative "skin-stringer" geometry used in typical aircraft fuselage shell architecture, shown as if cut open longitudinally and laid out flat, or "mapped," onto a two-dimensional plane having an abscissa parallel to the centerline axis x of the shell, and an ordinate corresponding to a circumferential distance $l_c$ from the abscissa (see FIG. 3), in which the structural components of the shell comprise at least an outer circumferential skin 40, or "aeroskin," attached to a generally orthogonal grid structure that includes a plurality of circumferentially spaced longitudinal "stringers" 42 disposed generally parallel to each other and the longitudinal x-axis of the shell, and a plurality of longitudinally spaced formers, or "frames" 44, disposed generally parallel to each other and orthogonal to the stringers. The frames may include circumferential flanges 46 and radial webs 48.

In accordance with the present invention, the weight-optimization, or tailoring, of the structure for a skin-stringer fuselage architecture such as that illustrated in FIG. 4 can include one or more of tailoring the associated structural attributes, in terms of $\varphi$, of: The gauge, or thickness of, the skin 40; the radial depth of the frames 42; the thickness of the respective frame flanges 46; the thickness of the respective frame webs 48; and, tailoring of the attribute as a function of $\varphi$ and stringer 42 cross-sectional shape and/or size (e.g., "hat-shaped", "F", "T", "L" shaped, etc.), plus the type of material, e.g., a metal, such as aluminum, or a non-metal, e.g., carbon fibers embedded in specified orientations, patterns and layers, in a resin matrix, from which each of these structural components are formed.

For so-called "composite-body" skins 40, the structural attributes can be tailored as a function of $\varphi$ and, e.g., the number of plies, or layers, in the skin, and/or the relative angular orientation angle of the plies to each other, and/or a percentage distribution, by orientation angle, of the plies provided at that particular $\varphi$. The skins can also be tailored in terms of variations in the types and quantities of materials (i.e., composite, metallic, or a combination thereof) used therein as a function of $\varphi$.

As is known, composite-body aircraft fuselage shells can advantageously incorporate skins comprising composite "sandwiches," i.e., stiff, lightweight "core" structures 50 comprising either a continuous foam or honeycomb cells 52 laminated between two circumferential skins, or face sheets. Representative core cell geometries are illustrated in FIGS. 5A-5D, where it should be understood that the cores are sandwiched between inner and outer face sheets (not illustrated).

Such tailoring of fuselage shell structural attributes as a function $\varphi$ and one or more other variables can also be advantageously applied to other structural components of sandwich composite structures, including the skins thereof, i.e., tailoring as a function of $\varphi$ and inner and outer face sheet properties, including the number of plies therein, respective ply relative and/absolute orientation angles, and/or percentage distribution by orientation angle of the plies provided at that particular value of $\varphi$, as well tailoring in terms of $\varphi$ of sandwich core thickness, and/or cell density, core material and/or sandwich-specific localized design and construction. Thus, for example, the core material can be tailored throughout the design process by varying, e.g., core material, type and density.

Tailoring of fuselage structural attributes as a function of φ can also be effected in the context of so-called "isogrid" structures. An isogrid panel comprises at least an external skin, or face sheet, as above, with integral stiffening or stringer members 60 that are arranged in patterns of cells 62, as illustrated in FIGS. 6A-6G, and is amenable to analysis using known isogrid plate modeling techniques. (See, e.g., Meyer, R., et al., *Isogrid Design Handbook*, NASA Center for Aerospace Information (CASI), NASA-CR-120475; MDC-G4295A, Feb. 1, 1973.) In the case of an aircraft fuselage shell, such isogrid structures can comprise a face sheet and integral stringer members that, in the case of composite-body structures as described above, can be laid up together by, for example, known fiber placement or filament winding techniques. Tailoring of the structural attributes of isogrid structures as a function of φ can be effected for isogrid structures in a manner similar to isogrid design and construction attributes that vary as a function of φ. This can include grid type, shape, spacing and material utilization, including mixing material types for both the grid face sheets and the isogrid integral stringer members.

Figure 7:
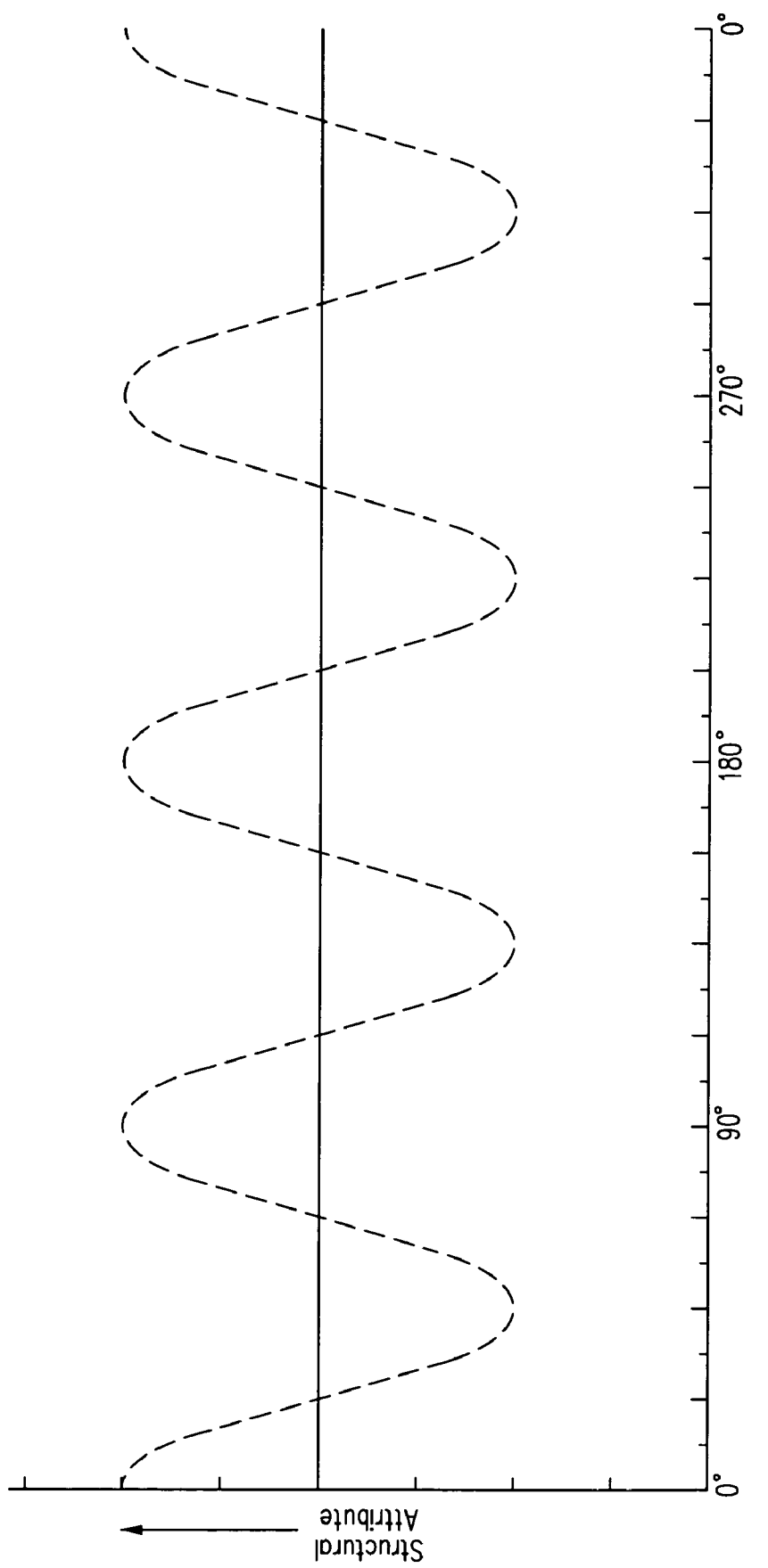
FIG. 7 illustrates an exemplary tailoring function of a structural attribute; and, FIG. 8 is a schematic plan view of a fuselage structure showing exemplary ply orientations.

FIG. 7 illustrates an exemplary tailoring function of a structural attribute plotted as a function of φ. This type of exemplary function is representative of when the structural attribute is linearly or monotonically increasing with increasing [|R(φ)-R̄|] or [|Curv(φ)-C̄ūr̄v̄|]. The structural attribute could be skin gage, frame depth, or other structural attribute. If the structural attribute is frame depth, local frame depth in a crown region (i.e., φ near 90°) is increased relative to average frame depth, and local frame depth in a keel region (φ near 270°) is also increased relative to average frame depth. It should be understood that the tailoring function shown in FIG. 7 is only exemplary, and that airplane-specific tailoring functions can differ in shape, character and magnitude as needed to minimize weight and drag for applicable loads.

Figure 8:
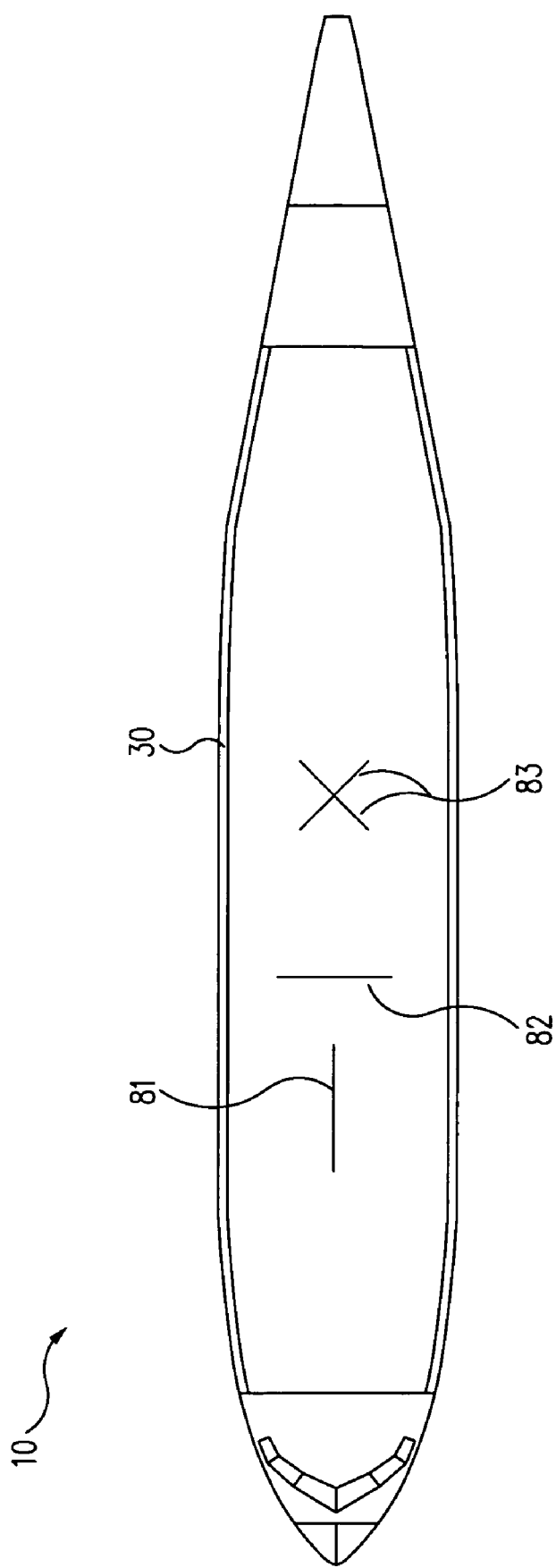

FIG. 8 illustrates a plan view illustrating representative composite fiber ply orientations, including zero degree plies 81, ninety degree plies 82, and plus and minus forty-five degree plies 83.

By now, those of skill in this art will appreciate that many modifications, substitutions and variations can be made in and to the materials, apparatus, configurations and methods of implementing and weight optimization of the near-elliptical aircraft fuselage structures of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. An internally pressurizable aircraft fuselage structure, comprising:
an elongated tubular shell having a centerline axis x, opposite closed nose and tail ends, and a non-circular cross-section having a radius $R(\phi)$ at substantially every point along the x axis between the two ends, where φ is a roll elevation angle varying from 0 degrees to +360 degrees about the x axis; wherein
the radius $R(\phi)$ of each cross-section of the shell varies radially by no more than ±7% from a radius $r(\phi)$ of an elliptical cross-section having a major axis with a dimension of $2 \cdot r_{max}$ and a minor axis with a dimension of $2 \cdot r_{min}$;
the shell has at least one structural attribute that has been tailored as a function of the elevation angle φ such that the weight of the shell required to react a design load incident thereon is less than that required to react the same design load, but wherein the at least one structural attribute has not been so tailored;
the shell includes structural components including at least one external circumferential skin attached to internal longitudinal stringers and axially spaced circumferential frames, each circumferential frame having a varying depth as defined by an outer edge of the frame lying substantially along a first elliptical path and an inner edge lying substantially along a second elliptical path, and,
the ratio of the major axis to the minor axis is greater for the second elliptical path than for the first elliptical path.

2. The fuselage structure of claim 1, wherein:
a maximum width of the shell is greater than a maximum height thereof and,
the maximum width and height of the shell are respectively substantially aligned with the major and minor axes of the elliptical cross-section.

3. The fuselage structure of claim 1, wherein $r(\phi)$ is given by the relation:

$$r(\varphi) = \frac{r_{min}}{\sqrt{[((r_{min}/r_{max})^2 \cdot (\cos\varphi)^2) + (\sin\varphi)^2]}}.$$

4. The fuselage structure of claim 1, wherein a curvature Curv(φ), defined as the inverse of the local radius of curvature of a surface of the shell, is associated with $R(\phi)$, and a corresponding curvature $k(\phi)$ associated with $r(\phi)$ is given by:

$$\kappa(\varphi) = \frac{\left[r^2 + 2 \cdot \left(\frac{\partial r}{\partial \varphi}\right)^2 - r \cdot \frac{\partial^2 r}{\partial \varphi^2}\right]}{\left[r^2 + \left(\frac{\partial r}{\partial \varphi}\right)^2\right]^{1.5}}.$$

5. The fuselage structure of claim 1, wherein the shell functions as a pressure vessel, and wherein the design load comprises internal pressurization loads.

6. The fuselage structure of claim 1, wherein at least one dimension of at least one of the structural components is tailored as a function of at least one of $R(\phi)$ and Curv(φ).

7. The fuselage structure of claim 6, wherein the at least one dimension comprises a radial dimension, an axial dimension or a circumferential dimension.

8. The fuselage structure of claim 6, wherein the at least one dimension comprises a thickness of the at least one external circumferential skin.

9. The fuselage structure of claim 1, wherein a local frame depth of the circumferential frames in a crown region of the fuselage is increased relative to an average frame depth.

10. The fuselage structure of claim 1, wherein a local frame depth of the circumferential frames in a keel region of the fuselage is increased relative to an average frame depth.

11. The fuselage structure of claim 1, wherein a local frame depth of each of the circumferential frames in left and a right side regions of the structure in a passenger cabin portion of the structure is decreased relative to an average frame depth.

* * * * *

UNITED STATES PATENT AND TRADEMARK OFFICE
CERTIFICATE OF CORRECTION

| | | |
|---|---|---|
| PATENT NO. | : 7,621,482 B2 | Page 1 of 1 |
| APPLICATION NO. | : 11/273966 | |
| DATED | : November 24, 2009 | |
| INVENTOR(S) | : Sankrithi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Twenty-sixth Day of October, 2010

David J. Kappos
*Director of the United States Patent and Trademark Office*